(12) United States Patent
Levitt

(10) Patent No.: US 8,872,854 B1
(45) Date of Patent: Oct. 28, 2014

(54) METHODS FOR REAL-TIME NAVIGATION AND DISPLAY OF VIRTUAL WORLDS

(76) Inventor: David A. Levitt, Sebastopol, CA (US)

( * ) Notice: Subject to any disclaimer, the term of this patent is extended or adjusted under 35 U.S.C. 154(b) by 221 days.

(21) Appl. No.: 13/430,670

(22) Filed: Mar. 26, 2012

Related U.S. Application Data

(60) Provisional application No. 61/615,573, filed on Mar. 26, 2012, provisional application No. 61/467,325, filed on Mar. 24, 2011.

(51) Int. Cl.
*G09G 5/10* (2006.01)

(52) U.S. Cl.
USPC .......................................... 345/633; 715/850

(58) Field of Classification Search
CPC ..................................................... G06T 19/006
USPC .............. 345/633; 715/850; 382/285; 463/31
See application file for complete search history.

(56) References Cited

U.S. PATENT DOCUMENTS

| | | | | |
|---|---|---|---|---|
| 3,602,702 | A * | 8/1971 | Warnock | 345/421 |
| 8,407,024 | B2 * | 3/2013 | Iketani et al. | 702/160 |
| 2008/0180409 | A1 * | 7/2008 | Matsuda | 345/177 |
| 2008/0211813 | A1 * | 9/2008 | Jamwal et al. | 345/426 |
| 2010/0013653 | A1 * | 1/2010 | Birnbaum et al. | 340/669 |
| 2011/0016430 | A1 * | 1/2011 | Fram et al. | 715/838 |
| 2012/0075285 | A1 * | 3/2012 | Oyagi et al. | 345/419 |
| 2012/0116710 | A1 * | 5/2012 | Fujiwara | 702/141 |

* cited by examiner

*Primary Examiner* — David Zarka
*Assistant Examiner* — Shivang Patel
(74) *Attorney, Agent, or Firm* — Peters Verny, LLP

(57) ABSTRACT

A portable display device is operative to modulate the appearance of a real or virtual image in response to the motion of the display device with respect to its relative movement with respect the object's virtual position. The display in effect becomes a portable window into a virtual world. The virtual object can be created from a real object by image capture and can be 2 or 3 dimensional. Specific modes of display movement can be used to infer a relative movement of the display window with respect to the one or more objects in the virtual world.

20 Claims, 10 Drawing Sheets

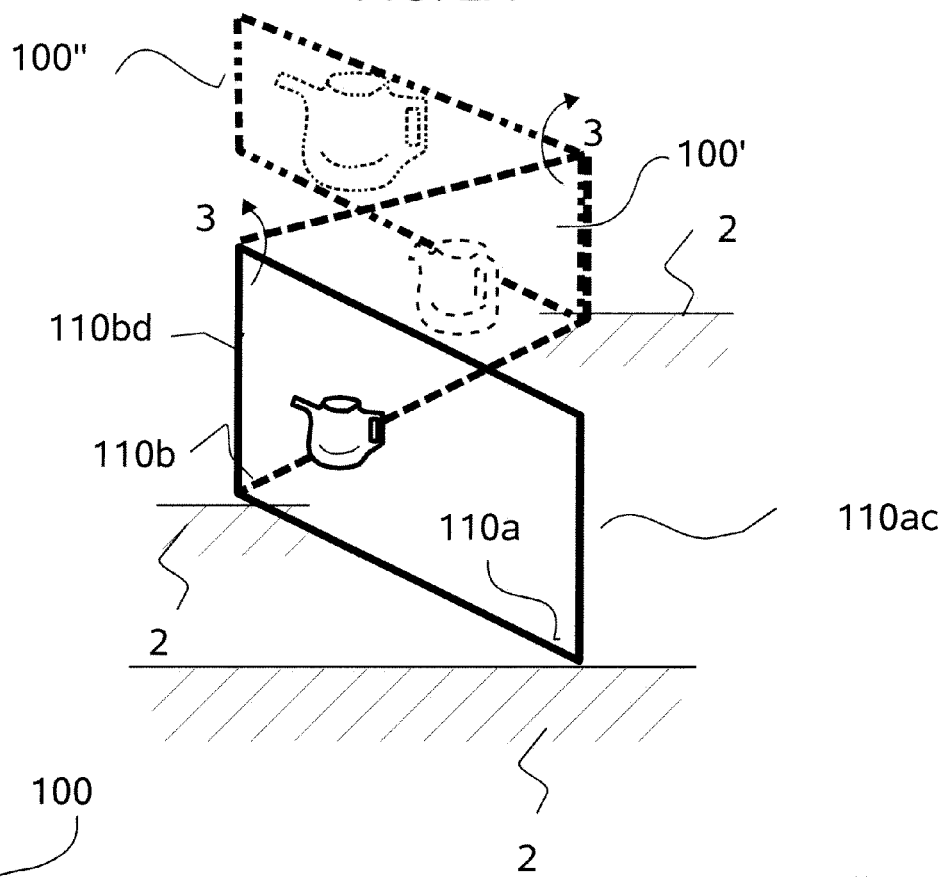
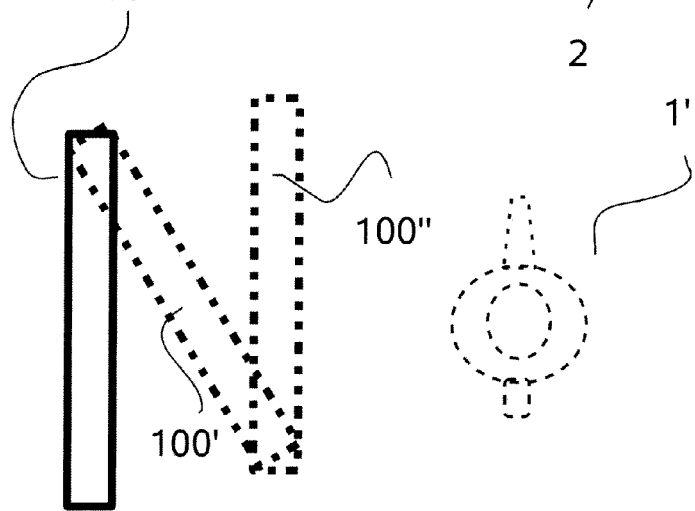

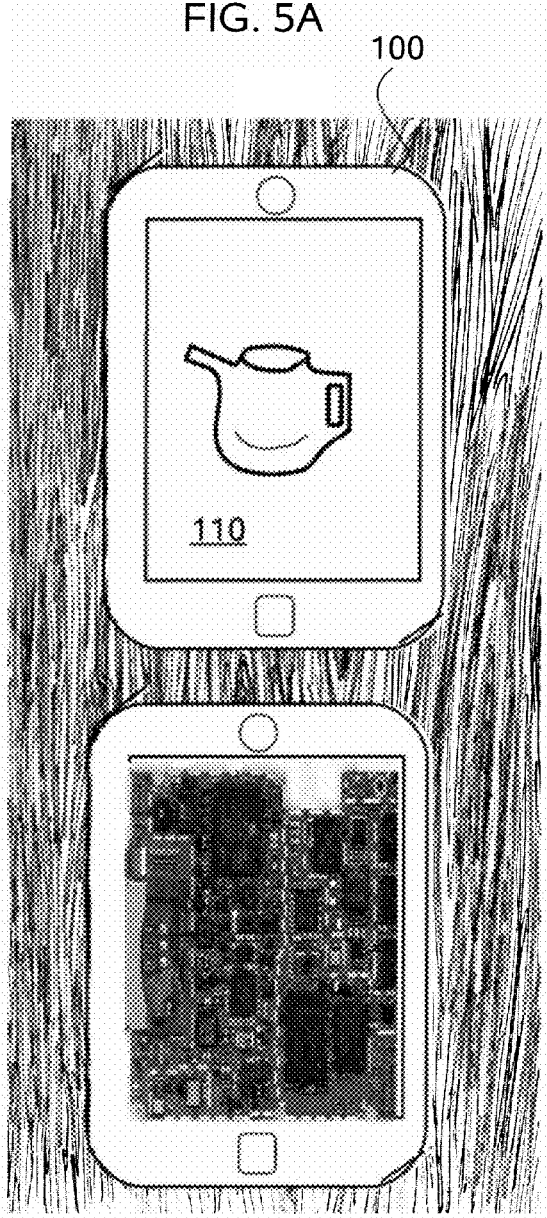
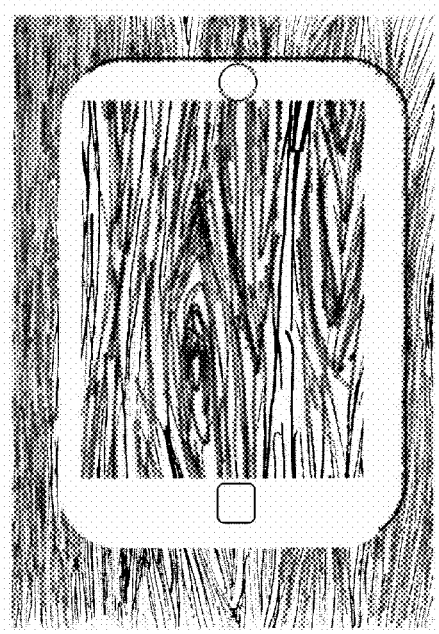
FIG. 5A
FIG. 5C
FIG. 5B

METHODS FOR REAL-TIME NAVIGATION AND DISPLAY OF VIRTUAL WORLDS

CROSS-REFERENCE TO RELATED APPLICATIONS

This application claims priority to and benefit of U.S. Provisional Patent applications:
61/615,573 filed Mar. 26, 2012, and
61/467,325 filed Mar. 24, 2011.
The above provisional patent applications are hereby incorporated herein by reference.

BACKGROUND

1. Field of the Invention
The present invention relates to virtual reality displays.
2. Related Art
Prior methods of virtual reality display systems deployed head or helmet mounted display that placed a viewing screen directly in front of the user's eyes and recorded the movement of the users head to determine what should be shown on the display. Thus, when the head turned to one side, the display was refreshed to show what was in the virtual world in the direction they turned their head.

SUMMARY

Some embodiments of the invention include providing methods for navigation by users and display of virtual objects, the method comprising the steps of: providing an electronic display having a movement tracking means, a data storage means, and computation means, providing in the data storage means a data structure for at least a 2D graphics model having a predetermined relative position with respect to the electronic display, moving the display, tracking the movement of the display, calculating the new position of the display with respect to the at least 2d model determining an updated appearance of the at least 2d image with respect to the display, and displaying the updated appearance of the at least 2d image on the display.

Some embodiments of the invention include a method of gesture identification to provide a new or changing image of a virtual object, the method comprising the steps of: providing an electronic display having a movement tracking means, and a data storage means, and computation means, providing a data structure for at least a 2d model having a relative position with respect to the display, providing a data structure having data representing one or more gesture criteria and an image transformation map for each gesture criteria, moving the display, tracking the movement of the display, calculating a figure of merit for the at least one transformation rule, when the gesture criteria figure of merit is met, calculating a new update of the at least 2d model, determining an updated appearance of the at least 2d image with respect to the updated model, displaying the updated appearance of the at least 2d image on the display.

Some embodiments of the invention include a non-volatile computer readable media having stored thereon executable code operative to operate a computer device with an electronic display, or electronic display output and motion sensors to perform the various methods disclosed herein.

Various embodiments of the invention include a method of displaying an image, the method comprising: retrieving a device geometry from a memory location, the device geometry including a representation of a computing device having a display screen, edges or corners, and motion sensors, and the device geometry including spatial relationships between the display screen, edges or corner, and motion sensors; receiving motion or position data from the motion sensors; receiving an image; determining an orientation of the image based on the data received from the motion sensors; displaying an image on the display screen at the determined orientation; determining a first rotation anchor point based on the data received from the motion sensors; detecting a first motion of the computing device using the motion sensors; changing the orientation of the image as shown on the display screen based on the detected first motion and the first rotation anchor point; determining a second rotation anchor point based on the detected motion; detecting a second motion of the computing device using the motion sensors; and changing the orientation of the image as shown on the display screen based on the detected second motion and the second rotation anchor point.

Various embodiments of the invention include a method of creating an illusion, the method comprising: receiving an image of a surface; displaying a user interface to a user on a touch sensitive display of a computing device; receiving at a first location of a first touch on the display; displaying the image of the surface at the first location such that a first part of the computing device appears to be transparent; receiving at a second location of a second touch on the display; displaying the image of the surface at the second location such that a second part of the computing device appears to be transparent; detecting a movement of the computing device using a motion sensor; and adjusting a position of the image of the surface on the display in response to the detected movement such that the surface appears to be stationary when the computing device is moved and the appearance of transparency is enhanced.

BRIEF DESCRIPTION OF THE DRAWINGS

FIGS. 1A and 1B are schematic illustrations of a suitable display having motion sensors suitable for creating virtual reality displays of one or more objects, in which FIG. 1 is the display surface of the device and FIG. 1B is a block diagram of select internal components thereof, according to various embodiments of the invention.

FIGS. 2A and 2B are diagrams showing a sequence of motions that can be used to modify the display and orientation of the display with respect to the virtual image stored within. FIG. 2A is intended to illustrated in a schematic perspective view 3 alternative position as the device is move by rotation about opposing corners, whereas FIG. 2B is a plan view of the movement of the device, according to various embodiments of the invention.

FIG. 5A-C show alternative invisibility modes of using the device, according to various embodiments of the invention.

FIG. 7A is a schematic perspective view of using the display to provide a virtual reality headset, whereas

DETAILED DESCRIPTION

Referring to FIGS. 1 through 9 there is illustrated therein a new and improved Method for Navigation and Display of Virtual Worlds, on a display device that is generally denominated 100 herein.

Figure 1A:
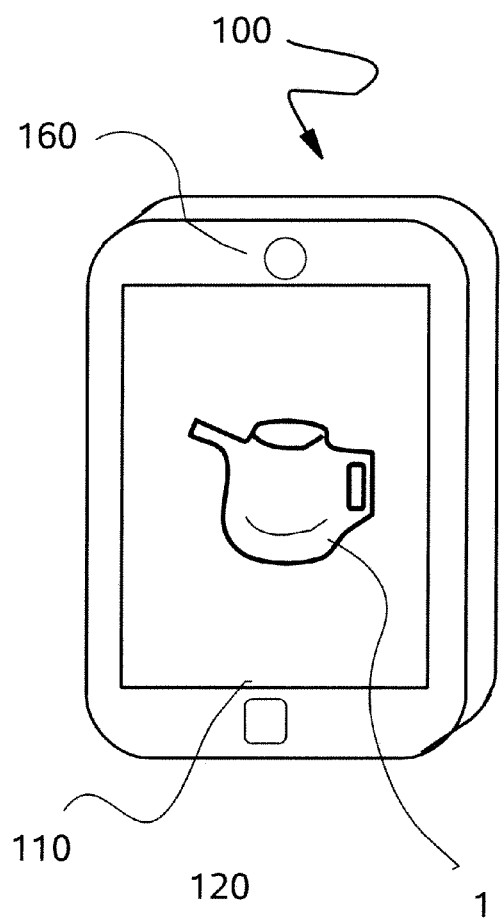
Figure 1B:
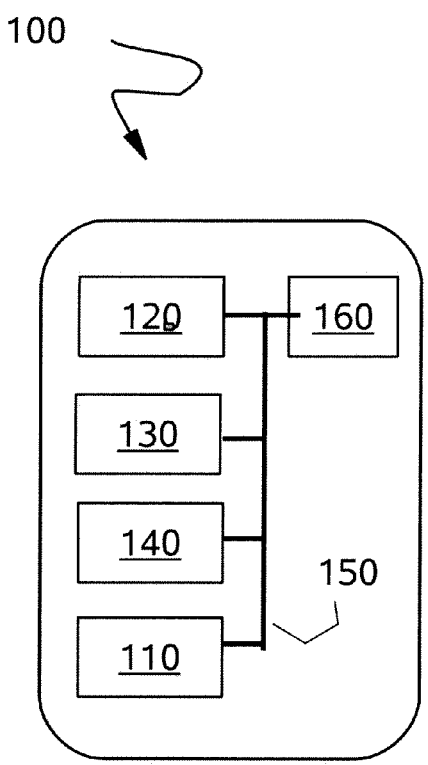

Display device 100, as seen from the exterior in FIG. 1A, has an electronic display element 110 on a least one side, as well as the internal components shown in a schematic block diagram in FIG. 1B that include at least motion sensing device 120, a data storage means 130, and a computation means 140, such as a microprocessor, all of which are in signal communication, such as through a data bus 150. The data storage means 130 when operative according to the inventive processes includes at least one data structure for storing at least a 2D image, but preferably a representation of a 3D object, such as the teapot 1, in FIG. 1A along with a relative initial position of the object or image with respect to the display device 100, as well as display parameters that account for the apparent position of the observer with respect to the display surface.

The data structure for storing at least a 2D image or a representation of a 3D object may include not only information about the shape and texture of the object and its surface, but also information as to how the object would appear based on the color, spectral reflectivity and light absorption characteristics of the surface, as well as the lighting conditions in the scene as well as any light emission characteristics of the object or objects/surfaces themselves.

The rendering of synthetic or virtual objects from different distances, viewing angles and light conditions is well known in the art of field of computer graphics and animation technology, using different data representation of 2D and 3D images, for redisplay as either 2-Dimensional images or stereoscopic 3D dimensional images.

In particular, the 3D object or scenery may be displayed as a 2D image on the display 110, or in a 3D mode using any conventional stereoscopic display mode where each of the user's or viewer's eyes is presented with a different 2D image. U.S. Pat. No. 5,588,104, which issued on Dec. 24, 1996 disclosure method and apparatus for creating virtual worlds using a data flow network, and is incorporated herein by reference.

U.S. Pat. No. 6,084,590, which issued Jul. 4, 2000, discloses further methods of virtual object display and manipulation, and in particular with respect to media production with correlation of image stream and abstract objects in a three-dimension virtual stage, and is also incorporated herein by reference.

The display device also preferably has one or more cameras 160 for capturing images and/or video sequences of real objects and scenes that can be used to generate or combine with the 2D or 3D image stored in the data structure. Further, images, video sequences as well as any other form of media that is displayed or manipulated in the virtual world on device 100 may also include: a) media that have been locally stored or synced from the user's computers (e.g. via iTunes), and b) media the device's user has accessed or can access over digital networks. Media types include, without limitation: a) photos, including images rendered in the 3D world with shadows, and the like, b) videos, including motion picture images rendered on the surfaces of 3D objects, c) 3D objects based on models, including jointed and animated and human-controlled models, d) sound, including directional and 3D sound and live voices of the players.

Portable devices, including display that deploy motion sensor and methods of using the motion sensor data for further computing purposes are described in US Pat. Appl. No. 2011/0054833 A1, which published Mar. 3, 2011, and is incorporated herein by reference.

US Pat. Application No. 2011/0037777 A1, which published Feb. 17, 2011, and is incorporated herein by references, generally discloses means for altering the display of an image of a device in response to a triggering event that includes a particular mode of moving that device that is detected by an on board motion detector.

Many portable electronic devices include electronic displays and cameras, as well as motion sensors. Such device include without limitation iPhone™, iPad™ *Apple, the Slate™ (Hewlett-Packard) and other devices known generically as Smart phones and Tablet computers available from a range of manufacturers.

Motion sensing device 120 may be any device configured to measure motion or acceleration experienced by device 100, such as an accelerometer or a gyroscope. In one embodiment, motion sensing device 100 may be a three-axis accelerometer that includes a sensing element and an integrated circuit interface for providing the measured acceleration and/or motion data to computation means 140. Motion sensing device 120 may be configured to sense and measure various types of motion including, but not limited to, velocity, acceleration, rotation, and direction, all of which may be configured in various modes described in detail below to update or refresh the display of the 2D image or the appearance of the 3D object in response thereto.

As such, in some embodiments the instant invention provides enhanced applications for the use of smart phones and touch screen computing devices as gaming and entertainment device.

In various embodiment, there an inventive process of providing the electronic display 100 having a movement tracking means, a data storage means, and a computation means, providing a data structure for at least a 2d image having a relative position with respect to the display, moving the display, tracking the movement of the display, calculating the new position of the display with respect to the at least 2d image, determining an updated appearance of the at least 2d image with respect to the display, and displaying the updated appearance of the at least 2d image on the display.

While the data storage means is preferably on the display, data representing the virtual object can be acquired from a remote storage device, such as a server, or via wireless or IR communication with another user of a different handheld display.

Preferably device 100 has a touch screen human data entry interface means, such as via a capacitive electronic touch screen display 100. Such modes of using touch screen input are disclosure in U.S. Pat. No. 7,479,949, which issued on Jan. 20, 2009, and is incorporated herein by reference. Such touch screen modes may be combined with any other form of motion tracking, described below, or used alone to translate or rotate the position of the screen window relative to the 2D or 3D virtual world. For example, through panning (motion translation) or rotating gestures, the viewpoint of the screen window in the world can be freely rotated about a selected axis, or allowed to spin as if it had real momentum until actually stopped by a user input, or via a modeled frictional resistance force.

By tracking the display, we mean determining from the movement of the display, and optionally with the use of other user interface input modes (such as depressing keys, or a touch screen), a new position of the 2D image or virtual 3D image with respect to at least one or the user and the display for the purpose of recalculating the appearance of the 2D image or the virtual 3D object on the electronic display. Such tracking can optionally be done in real time and the image updated every time the display image is refreshed.

There are various alternative modes of display tracking, which shall be generally described as a. Integration based to obtain an absolute position; b. Rule and Constraint Based, and c. Gesture based: a particular mode of display movement provides a unique mode of image change.

An integration based mode of display device tracking means that once a threshold acceleration, generally above the noise level, in each axis or direction is detected, the duration is measured to calculate a displacement of the display. Multiple steps or changes in acceleration are similarly added from the start of motion and summed as frequently as the simulation frame rate of the display as desired to determine a new display position with respect to the virtual object.

A Rule based mode of display device tracking means that the device position in the virtual world is determined using the device geometry in combination with a known or expected movement state as is further illustrated in FIG. 2. Device 100 is alternatively rotated about different opposing or adjacent corners. Each rotation step displaces the display 100. To determine the location of the display continuously it is first necessary to determine which corner is being used for rotation, and then the degree of rotation, with the displacement then calculated based on the known dimensions of the display, i.e. the physical distance between corners. Accordingly, in the process of using a Rule and Constraint method according to the flow chart in FIG. 3 there is an initial step of determining a lowest corner, which as part of the rule the user is instructed to use a lower corner as the rotation axis. The display position is then determined from adding the device displacement from a sequence of rotations about different corners of the device to relocate the device.

An example of such movement of display 100 is shown in FIG. 2 in the user of the device has been given the instruction, "On a flat surface like a floor (ref. no. 2) or table, face the device screen upward and rotate the device about just one of its four back corners at a time, lifting the opposite corner slightly, thus ensuring that one corner is lower than the others."

Thus, corner 110a first is the only corner to touch the table before rotation by reference no. 3 about the same side 110ac as the rotation axis. After the first rotation step, the device 100 has advanced to position 100'. Next, with corner 110b, being lower than the other four corners device 100' is rotated about the side 100bd, a further rotation about side 110ac with corner 110a touching surface 2 advance the display to position 100."

The position of the corners relative to the device center and the device display screen(s) can be determined by reference to a known Device Geometry Database, in data storage means 130, which includes the position of the motion sensing device (s) on board the device 100, (see below) and determination, automatically through software APIs or by querying the user, which device is being used. A dynamic Gravity vector indicating which magnitude and direction gravity is pulling relative to the dynamic orientation of the device can be estimated from accelerometer data, and in addition calculated more precisely using gyroscope data. (In fact, APIs for the Apple iPhone/iPod Touch 4 and iPad 2 calculate a 3D Gravity vector accessible by software applications which, along with a 3D User Acceleration vector, such that when added equal to the total 3D acceleration of the device.) For the simple 4-corner geometry in this example, with the device roughly laying on its back side with the display facing up, the lowest corner can be calculated using this arithmetic sign of the X and Y coordinates of the gravity vector. (Here, positive X is to the right and positive Y is down):

when X gravity<0, Y gravity<0, then the upper left corner is lowest when X gravity<0, Y gravity>0, lower left corner is lowest when X gravity>0, Y gravity<0 then the upper right corner is lowest when X gravity>0, Y gravity>0 then the lower right corner is lowest The algorithm updates the center of rotation in the model such that the current yaw rotation around Z, as measured by the gyroscope reading, may be negated and applied to the yaw orientation of the display image so that, if the user is indeed rotating the device around its lowest corner, the image remains approximately stationary in space as the device moves.

This approach can be applied generally to a different or larger set of rotation axis candidates than the 4 corners, and the axis chosen by the system at any time may be the one for which parameters derived from the accelerometer and gyroscope data, such as the gravity estimate, that most closely matches the geometry constraints given by the device geometry and/or the instructions given to the user. This method is illustrated in the flow chart in FIG. 3. The Device Geometry data may include a more complex device shape with any convex cross section and combine this info with the orientation and gravity vector information to calculate the lowest point, the contact point if the device is on a flat table or floor. In the extreme case of a spherical device of radius R, there are no corners but the lowest (contact) point is easily calculated from gravity and the distance of the rolling device rotating with angle THETA is R*THETA.

Note that, through techniques understood by those versed in computer graphics, this approach can be applied in 3D and, using quarternion representations of the orientation (also available in the Apple iPhone APIs), can provide stable orientation representation throughout the range of 3D motion and orientation in any direction.

To apply the device geometry data to recalculate the position of device 100 in FIG. 2b may require one or more of the following in a database of devices and their geometry parameters, indexed indirectly or directly the device brand and model number. Such device geometry data may include, without limitation: a) screen geometry (L, W, bezel dimensions and the like), b) 2D and 3D models or other information approximating of the shape of the device, and c) the size and location of built-in display(s) and camera(s), including camera optical and/or digital zoom information. For example, the width, height and depth of a device may roughly approximate a 3D rectangular prism with a 2D rectangular display at a particular location. In principle, the shape of any device may be accommodated given enough detail. The database can enables an automatic method of determining which of several device models geometries the software is running on, and their corresponding geometries, and may include one or more monochrome images in the shape of the device for use as a shadow.

Additionally some display controlling gestures may in include constraints and require the cooperation of users. AS a non-limiting example, some motion gestures may be geometrically constrained in ways that require the user's cooperation, like "keep the device screen centered about 2 feet in front of your eyes", "walk in a 10 foot circle while pointing the normal of the screen towards its center", or "keep the device flat on its back on the table or floor, always keeping at least one corner fixed and rotating around it". The user may attain multiple rewards from following the instructions, first being a stable virtual world experience where the model takes advantage of those constraints easy, consistent navigation by motion gesture. Conversely, a user violating the stated constraints (for example, translating when only rotation is expected) may cause a transition to a different set of constraints (for example, as pulling the table rather than moving across a fixed table).

Additional cues to the user, as well as rewards and demerits for violating the constraints, can be provided by the system. a) grating scraping noise when the table is being pulled, b) sound, image, shadows, etc. of objects falling over when the table is moved, c) a soothing audio tone that continues when the user follows the constraints perfectly, d) a tone that becomes more annoying when the user strays from the constraints and the like. And, in game environments with scoring, scores can be increased when the user follows the constraints and/or decreased or rationed when the user is violating them.

A Gesture based mode of display device tracking means a particular mode of display movement provides a unique mode for revising the apparent position of the display with respect to the 2D image or virtual 3D object, as well as a unique mode of image change, as for example a different gesture for zoom vs. rotation of the object or the viewer's position. Any combination of display movement and touch screen activation may be combined in a Gesture.

In using a Gesture tracking mode it is necessary to first identify the unique gesture start, the extent or magnitude of the gesture and the end of the gesture. If rotation of the display is used as part of the gesture, the tracking may include a process step of determining the rotation axis from the gyroscopic change in orientation and the signs of the acceleration from one or more accelerometers. Further, as the display may be operative to recognize a variety of gestures, it is also necessary to provide a data structure having data representing one or more gesture criteria and an image transformation map for each gesture criteria, based on the magnitude the gestures. Such criteria should include parameters for detecting the start and completion of the gesture. Thus, upon moving the display, the computation means is operative to tracking the movement of the display and calculating a figure of merit for the at least one gesture criteria. Then, when the gesture criteria figure of merit is met, the computation means is further operative to calculate a new apparent position of the at least 2D image or virtual 3D object from an image transformation map. An image transformation map is the transformation rule for creating a new view point condition for the 2D image or 3D virtual object from the magnitude of the gesture that is identified. Upon application of the image transformation map the computation means is operative to determine an updated appearance of the at least 2D image/3D object with respect to the new apparent position, which is then appears on the refreshed image on the display 100.

Figure 3:
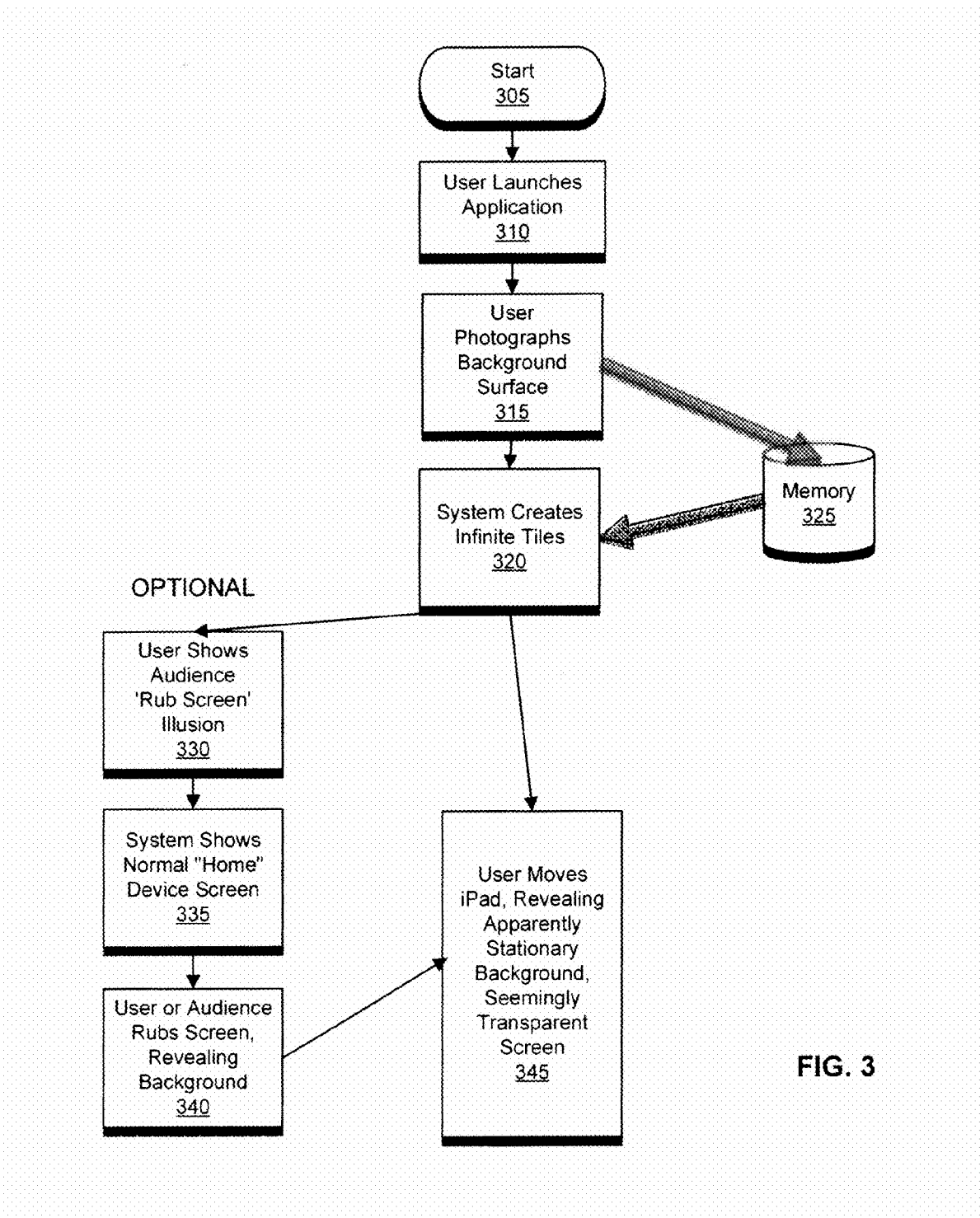
FIG. 3 illustrates the steps a user may perform to produce an illusion, according to various embodiments of the invention.
Figure 4:
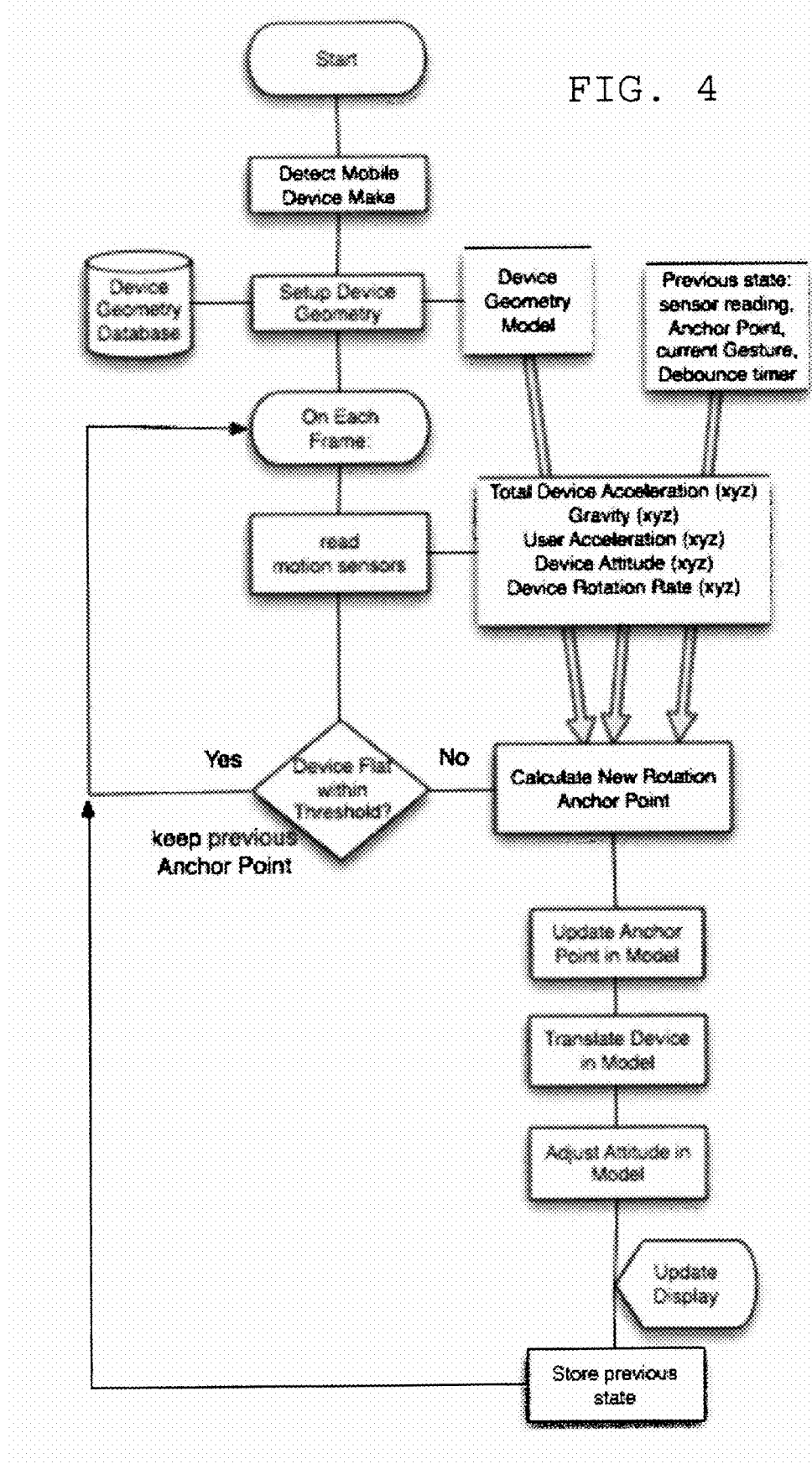
FIG. 4 is a flow chart illustrating the calculations used to update the virtual image display that corresponds to the motion pattern in FIG. 2, according to various embodiments of the invention.

FIG. 4 is a flow chart illustrating the operative principles of a Gesture based motion tracking and includes further details of the steps in FIG. 3. The logic includes a Device Geometry Database including dimensions height, width, depth, and screen location, location of motion sensors, etc for one or more devices compatible with the software.

On launch the software uses operating system API or other method to determine which device is being used (e.g. iPad or iPhone) and sets up geometric information including distances between corners and sets up corresponding model of the device within the 2D or 3D environment.

Since it is animation, the remainder of the algorithm is a loop for repeatedly drawing frames to achieve the invisibility illusion while the device is moved.

The device's motion sensors 440 are read. These may include 3D acceleration, 3 axes of rotation, as well as rotation rate and Gravity vector estimation from which can be assessed, for example, the lowest point on the device given its geometry.

If the device is being rotated around an anchor point according to instructions, for example "hold one corner of the device fixed on the table and lift and rotate the opposite corner", the corresponding geometry may be enforced in the software.

A new current rotation anchor point is calculated 450 which may be algorithmically dependent on the previous rotation anchor point 430. The algorithm may include 'Debounce' and other time-dependent software so the anchor point does not change frequently or suddenly or interrupt a gesture in progress.

Once selected, the anchor point may be updated in the model 455.

The location of the device and background image in the model may also translate 460 as a function of the motion sensors' acceleration measurement—sliding the device across the table and accumulating velocity through standard integration of acceleration. To keep the image stationary in the physical world, the model adjusts the image in the opposite direction.

Likewise, the orientation or attitude 465 of the model, including the background image, may be updated to keep it stationary in the world despite motion of the device, by rotating the image in the opposite of the measured motion direction.

When the model has been adjusted in these ways, the system updates the display 470 to compute the next frame and stores the previous state 475 for potential reuse during the next frame calculation 430.

In some embodiments, accurate and stable constrained device motion estimation may benefit from the assumption that, throughout a certain motion gesture by the user, some constraints (such as the axis of rotation) may remain fixed throughout the duration of an action we will refer to as a motion gesture. This lets the algorithm interpret accelerometer and gyroscope data in ways that follow this constraint and enforce it in the internal model of the device's motion in space. For example, in a case similar to the corner walking example described with respect to FIGS. 2A and 2B, if the device is lying perfectly flat there may be no lowest corner within the noise limits of our accelerometers (X gravity~=0, Y gravity~=0). In such cases the algorithm can estimate the axis of rotation by comparing the accelerations and angular motions (and derived velocity, position and orientation) and finding the best match among the anchor points (e.g. the corners) near the beginning of the gesture, and treat this as the axis of rotation throughout the remainder of the gesture.

To implement this approach, the algorithm uses: a clear definition of gesture start criteria, and a gesture stop criteria within a gesture, and the set of geometric constraints that are fixed. In the example above, we may use a table such as the one below to find the best rotation axis candidate. A finite set of candidates makes the algorithm less susceptible to accelerometer noise and accuracy limits. In principle, only the signs of the velocities and rotation are needed.

In summary, such gesture based tracking methods are expected to provide a nearly instantaneous response as well as a stable simulation.

Another embodiment includes creating the virtual object from one or more images acquired by the display using an on board camera at a fixed position, with tracking of display movement between images. One such embodiment of this aspect is photographing a 2D surface, like a floor or table, to create the 2D image. The 2D image can be expanded to any size, including an infinite size by tiling the basic image. When the display is placed on the table it can be move in various ways in and out of the plane of the table. Further, this method may be expanded to include a means of smooth photo-based tiling in which a tiled surface environment (wood grain, square tiles, other repeating patterns) the system can assemble alternating reflected images along each axis of the horizontal and/or vertical tiling, thus eliminating abrupt color changes and allowing smooth tiling with, effectively, horizontally and vertically antisymmetric tiles 4× the size of the original image. This may have been done in many environments, but not necessarily in mobile virtual worlds.

Further, as a particular form of novelty, the device may be configured to simulates the invisibility of the front portion of the device display to reveal the electronic components as well as the invisibility of the entire display portion to reveal the supporting background object, as shown in FIG. 5A-C. In FIG. 5A, the device 100 is resting on the table, shown as a wood grain background, but using the display 110 to provide a stored image of an object. While a coffee cup is shown as a simplified example, in typical cases, the display 110 will show the "home screen" of a user interface (UI) with icons, such as that of the iPad. (See FIG. 8) A picture of the table has been captured with camera 160 and stored in the device 100. Upon rubbing the screen or display, or using an alternate human interface device, the screen 110 may display the portion of the table image that it extends over, such that all but the frame or bezel of the device 100 around the screen "disappears" as shown in FIG. 5C. Alternatively, an image may be displayed on the screen, such as for example the image of the internal electronics as shown in FIG. 5B, making the face of the display above these electronics seem to have disappeared. Various input modes can be used to toggle between any of the appearance of the display device in FIG. 5A-C.

Figures 6A, 6B:
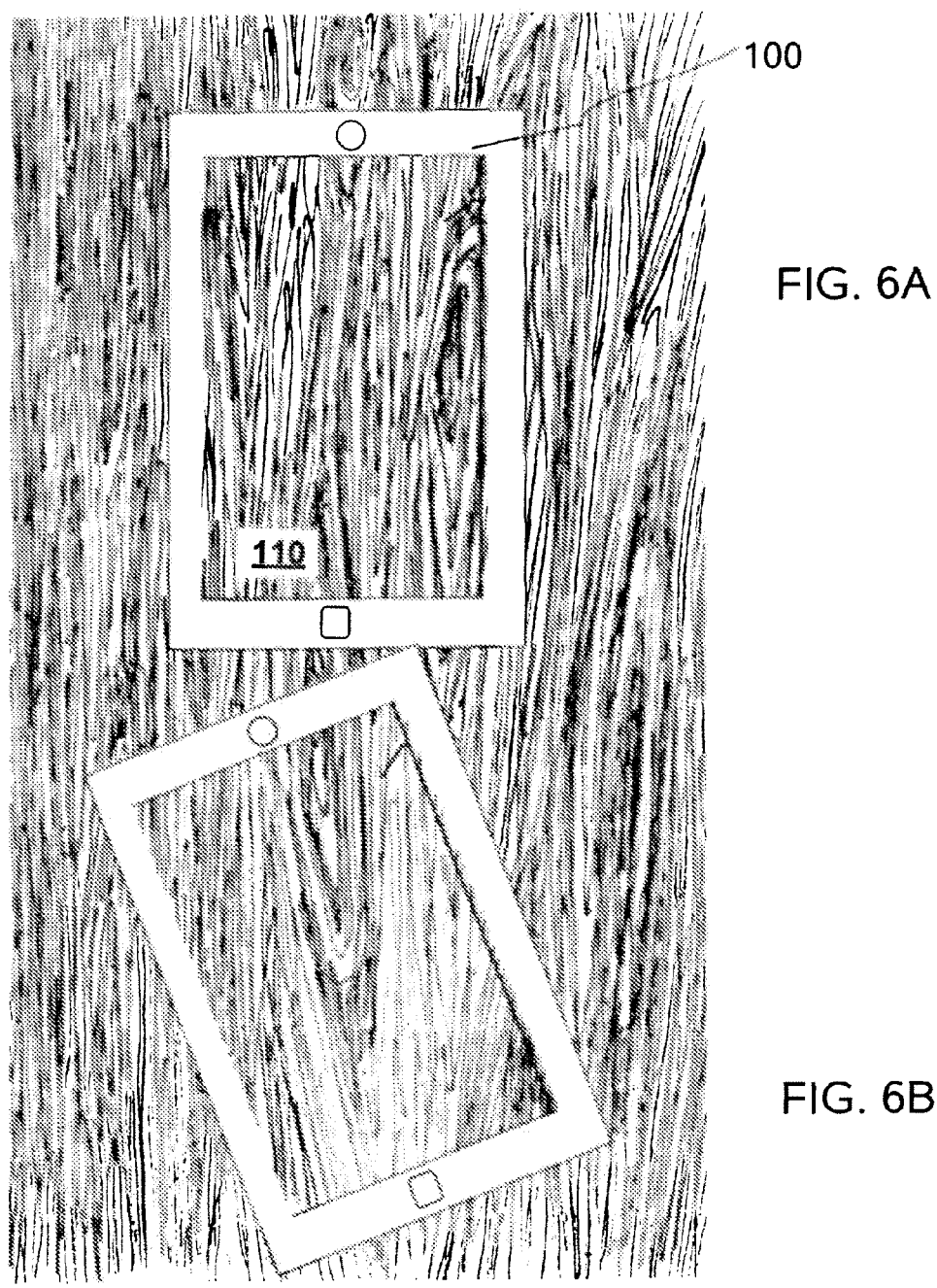
FIG. 6AB illustrate invisibility mode of the device at different orientations on a table or flat surface, according to various embodiments of the invention.

FIGS. 6A and 6B illustrate this application of the inventive tracking modes described above. Simulations that may be deployed in this embodiment include without limitation the uses of a virtual 2D Surfaces not only the Invisibility of the device 100, as illustrated in FIGS. 6A and 6B, but also with or without shadows and reflections, any form of camouflage that involves taking a picture using the camera, tiling the image, including cropping on real tile boundaries, making objects disappear, appear, or change in response to some simulation of the display. Contacting the display surface is optionally operative to switch to virtual images displayed thereon (example: the electronic components of the display and the image of the support structure behind the display as shown in FIG. 5B) as well as for superimposing multiple virtual objects.

Figure 7A:
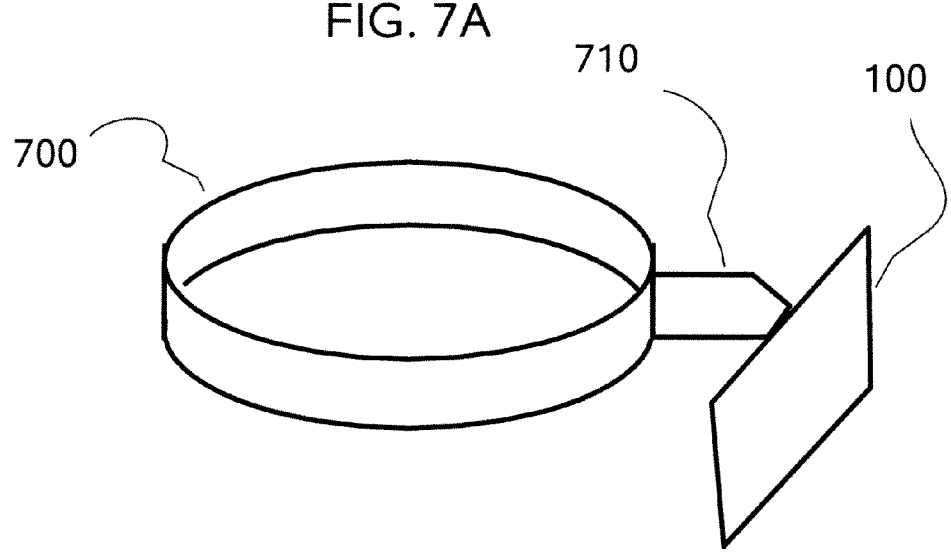
Figure 7B:
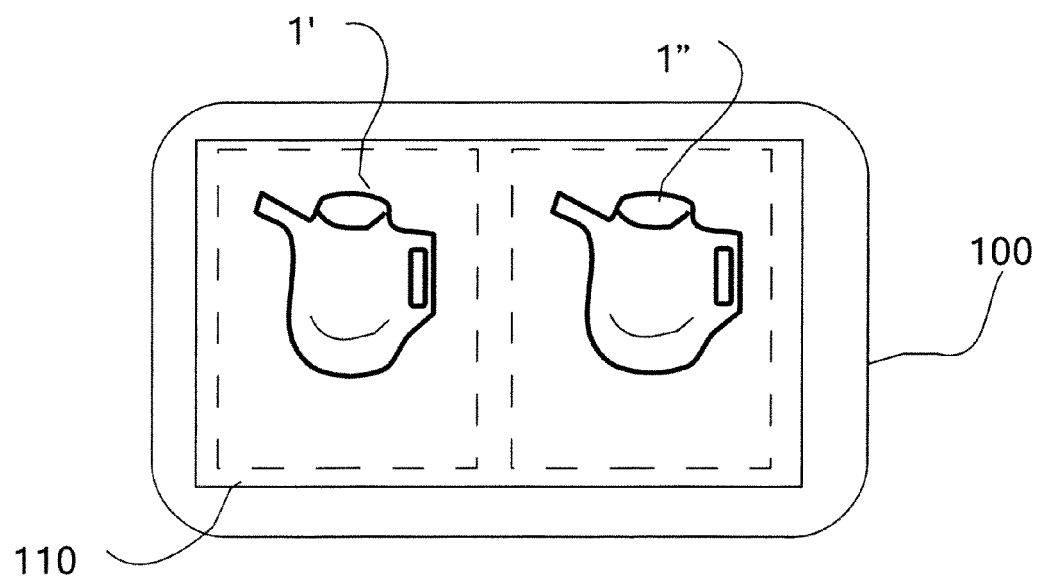
FIG. 7B illustrates the stereoscopic viewing mode of the device showing a different sub-image for the right and left eyes, according to various embodiments of the invention.

Further, in some embodiments, the instant invention enables the use of smart phone as a component in 3D virtual reality headsets, and in particular for displaying a pair of adjacent stereoscopic images. This is schematically illustrated in FIG. 7A which shows device 100 is head mounted in headset or helmet 700 for stereoscopic display as shown in FIG. 7B. The device 100 is secured to the headset/helmet 700 by attached mount 710. As an alternative or in addition to such head-mounted virtual reality shown in FIG. 7, it is also possible to mount the mobile display device 100 in eyeglasses. Display screen 110 shows different sub-images for the right and left eye of the teapot 1' and 1".

Movement of the display may be reflected in the virtual reality world in additional modes. For example, images or parts thereof recorded by a camera or video on the displays device can be part of the virtual world that is manipulated the movement of the display device. Other applications and embodiments of the instant invention include various forms of Illusions and magic, such as the fingertip virtual reality and the table top, floor top, and handheld experiences described above. In such modes on table or floor top, a gesture optionally ends when rotation or translation drops to near noise floor of the motion sensing devices.

In other modes gestures deploying the head mounted device 100 shown in FIG. 7A, or eyeglass mounted display can deploy 'stop/start gesture' measurements though they are likely to be noisier than bird-like head motions which would be required to distinguish discrete gesture in sequence. Further, quarternions can offer natural representation for each rotation gesture.

In another embodiment of the invention, movement or gesturing with the display may provide a mode of augmented reality using the rear facing camera or similarly mounted camera.

In another embodiment of the invention, movement or gesturing with the display may provide a multi-user virtual reality in a single location, as for example with shared geometric constraints for example; multiple viewers might carry windows that let them walk around the same object. Various methods can be used to align multiple users' virtual worlds using reference object(s) visible to multiple device cameras 160.

In another embodiment of the invention movement or gesturing with the display may provide a telepresence for multi-user virtual reality over digital networks. The above steps can be used in further embodiments for a virtual world authoring system, games, including without limitation races, scavenger hunts, Marco Polo and the like.

Other embodiments may include manipulation of virtual 3d objects by reaching into the frame in augmented reality. Any mode of manipulating the virtual 3d objects may include operation by voice command as well as operation by motion gesture, constraint update and/or status of the device can be provided by graphic overlay. In addition, a constraint update and/or status signaled by audio or voice. Other embodiment may include integration with global sensors compass and GPS let the user compare apparent accumulated device motion with macro changes in the user's location and orientation as measured by other devices.

Further, as such device 100 are frequently what is known as smart phone they also include audio output means such as speakers and headphone output ports. Therefore in other embodiments of the invention, these may be advantageously deployed as a user navigates toward an object, its sounds gain increases, perhaps exaggerated. For objects emitting continuous sound this can be among the best ways to locate an object off screen. As a user pivots near an object, 3D effects that may include interaural delay which is disclosed in U.S. Pat. No. 3,504,120, which issued Mar. 31, 1970 and pinna filtering that reflect the location of the sound and the user head orientation, such as is disclosed in U.S. Pat. No. 5,751,817, which issued May 12, 1998, both of which are incorporated by herein by reference.

Further the displayed image when updated to reflect display movement, or a display gesture used to indicate reposition or orientation of the display and view with respect to some aspect of the virtual world may also deploy live video of the user (e.g. their live face, as seen through iPhone or other camera, rendered onto an avatar. This live video is optionally what the user sees—which might be seen on a TV in the world, or composited as a panoramic augmented reality background.

Further, movement of the display and the image displayed thereon, or on the display of another party, a player or game participant may include handheld avatars and Mobile Puppetry—derived from the other participant/player's representation of both display device, and implicitly, the hand motion in the space. To participants in the world, users' mobile avatars can look like anything from: a) a simple iPhone 4™ or iPod Touch 4™ rendered in 3D, b) an iPhone or like device in a rubber case, indicated by either player (say for example distinguished by a different color case or protective bumper), c) a moving character or monster—in effect, a 3D animated costume for the iPhone the user is handling. AS a non-limiting example, in a race game where multiple players are chasing a roach or mouse, the opponent's display device 100 might appear simply as that brand of phone scooting and rocking across the table, attempting to flatten and squash the roach. But it could also appear to both players as a moving upper jaw with snaggly teeth and meeting a lower jaw that scoops along the surface of the table—or, as the jaws of a much longer snake whose tail whips in waves whenever the rigid device 100 is turned by that player. Such an avatar would let a user turn and see his own tail or body in the world. This avatar can be further reinforced by the shadow the display device 100 casts and/or the way device 100 appears in mirrors, as well as in other players' reactions.

The avatar might have one or more visible eyes approximately where the device camera(s) 160 are found. And in battle, a carefully placed blow to an eye could obscure or eliminate the opponent's vision. Whether in they're in one location or in telepresence applications, when the user's avatars reach the same virtual location, or other predetermined positions in the model they can optionally see each other, grow large in perspective, etc. When device 100 is held in hand rather than mounted to a user's head, this use of mobile devices amounts to a kind of digital puppetry.

The ability of handheld avatars emulated on the display device 100 to collide can be indicated by many alternative means. As a non-limiting examples used in many other games, the ability to vibrate the phone can help simulate the collision, but now the collisions are a direct result of motion through space, and can signal resistance from a fixed obstacle, collision with an opponent, or violation of the underlying 3D model.

In an additional embodiment of the invention various Object Recognition Tricks may be performed, particularly in the case of Augmented Reality applications outlined in the invention summary, when a product (say, a Scrabble board) appears in the scene, the image OR bar code can be scanned to access a database containing more exact dimensions—or a complete 3D model—of that object, from its maker, fans of it, or public or private databases (akin to CDDB/GraceNote for music tracks). This can have many applications, including more perfect registration of recognized objects and objects near them in the augmented reality world, automatic rendering of surfaces currently hidden from the camera, etc.

Figure 8:
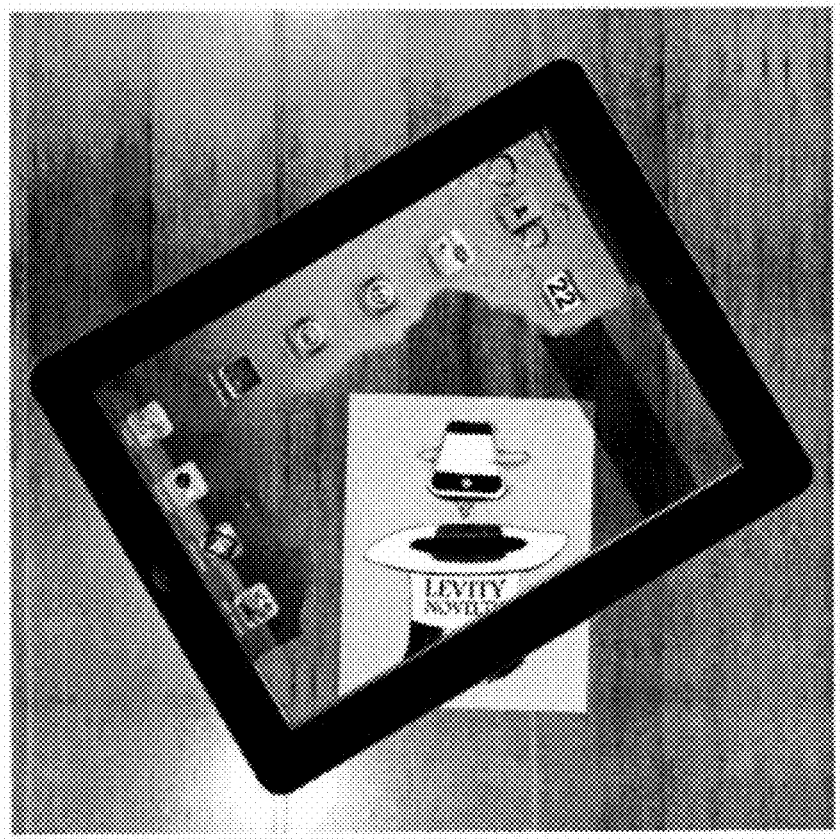
FIG. 8 is a demonstration of a first intended commercial version of the device, according to various embodiments of the invention.

FIG. 8 is a demonstration of a first intended commercial version of the device, which is intended to offer the following features:

"Invisibility

Give your iPhone the superpower of invisibility. Through a bit of magic, its screen can behave like transparent glass. You and your friends can see right see through it to a table top or floor underneath—even as you move the device around!

Eye Popping Magic

Lift one corner of the iPhone—holding the opposite corner steady with your finger—and turn it. Instead of moving, the table top image remains fixed in space—while the moving iPhone screen just uncovers more of the table!

The iPhone even casts a shadow on its image of the table, just as if there was a big rectangular hole in the device. Walk the iPhone across the table and uncover a far bigger world inside—an infinite surface that includes your favorite synced Photos.

Quick Start

For instant magic, before you launch Invisibility, snap a shot of your Home screen by holding down your iPhone's Home and Lock buttons together. You'll hear the flash.

Then bring your iPhone over to any well-lit flat table, counter or floor, and launch Invisibility. Hold your iPhone about 14 inches above the surface and take a picture. Set the iPhone down at the center of the spot you just photographed, and start the fun.

You'll recognize the home screen shot you took. At first, rubbing it will make that area transparent, exposing the electronics underneath. Rub more and the table top itself begins to show through. Then the magic really starts.

How it Works

Invisibility takes unique advantage of sensors in the iPhone 4, iPod Touch 4, and iPad 2—in particular, the 3D gyroscope and accelerometers. Levity Novelty's patent pending Pantomime technology tracks just how your iPhone is moving, and updates the display accordingly to keep the virtual table in one place even as the iPhone moves.

The iPhone's retinal display and camera are also ideal for Invisibility. Your photo of a table top has more pixels than an 1080p HD image, and shows them with more resolution than your eyes can resolve—perfect for magic."

Figure 9:
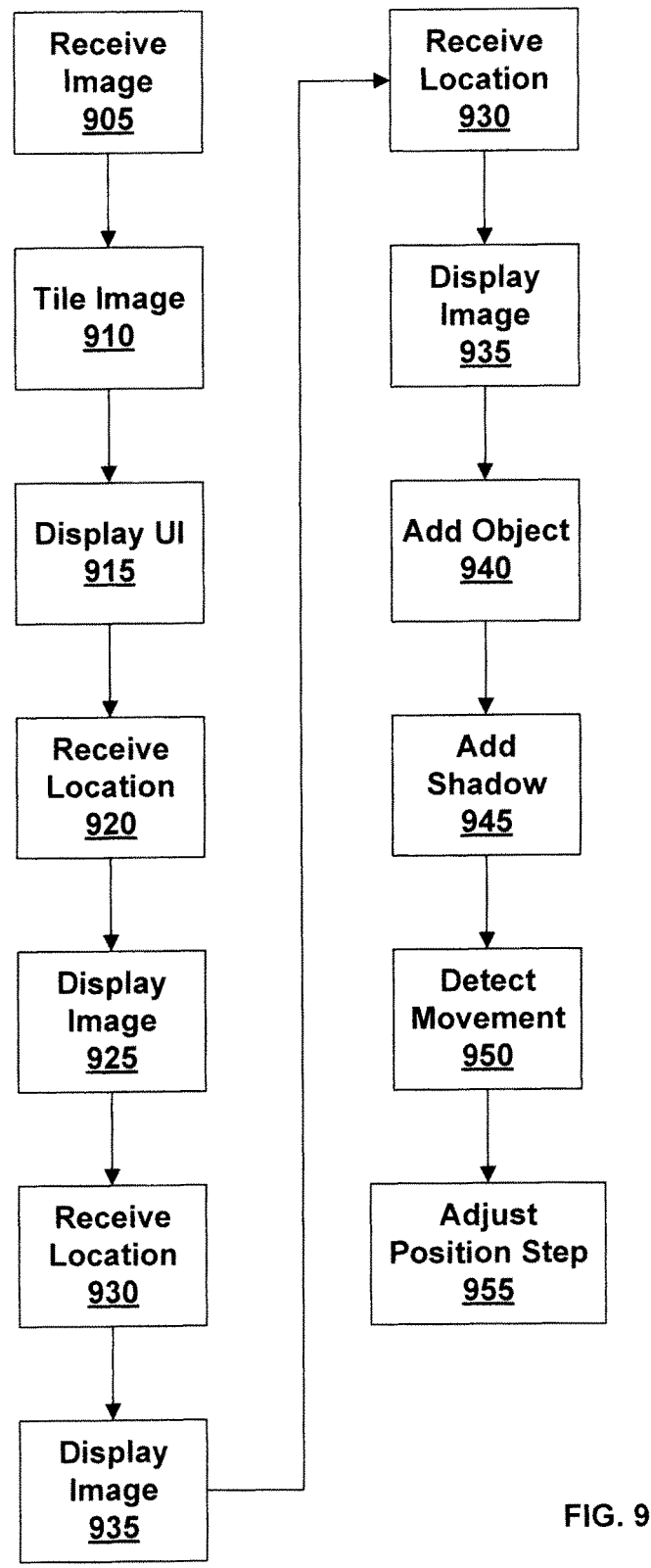
FIG. 9 is a flow chart illustrating a method of simulating device invisibility, according to various embodiments of the invention.

FIG. 9 is a flow chart illustrating a method of simulating device invisibility, according to various embodiments of the invention.

In a receive image step 905 receiving an image of a surface. This occurs through a software interface such as an operating system API, an image is received from the camera and stored in the device.

In an optional tile image step 910, tiling is achieved by alternating rotated and reflected copies of the received image along each of the vertical and horizontal axes. In effect we create a super-tile from four copies of the original image, one rotated 180 degrees, one reflected vertically and one horizontally which are internally seamless and which connect to other supertiles seamlessly. There may be more than enough supertiles to fill the screen; this can be computed as a function of the camera image dimensions versus the screen dimensions. Thus, the method optionally further comprises tiling the received image of the surface by reflection and displaying a tiled part of the image during the step of adjusting the position of the image.

In a display UI (User Interface) Step 915, the user may be presented with an instruction in the graphic interface such as, press this button to Rub Away your Screen, which when pressed shows a typical static image for that device such as the Home screen icon interface (see for example FIG. 8).

In an optional receive location step 920, the system adjusts the size, location and/or orientation of the image using standard touch and pinch gestures and/or receives a Touch from the user on that screen, typically using an API of the device OS such as Apple's iOS Touch API. The API provides the finger count and touch location to the program in real time. The location is used as the center to write into the transparency or Alpha channel, painting an oval approximately the size of a finger at that location. If the camera or supertile image is the layer below, it will be revealed. The Touch interfaces allow, for example, different size ovals depending on how many fingers are touching the screen, or different kinds of transparency. Thus the method optionally includes receiving at the first location a third touch on the display. This touch reveals an additional layer. For example, a table under the device.

In an optional display image step 925 (circuit board image) an additional touch, or a different number of fingers, may reveal an intermediate image such as an image intended to represent the device circuit board between the screen and the table beneath it. The system writes into the alpha or transparency channel of the circuit, but the opaque circuit become visible. Thus, the method optionally includes displaying an image of an electronic circuit at the first location such that a part of the display but not other parts of the computing device appears to be transparent, wherein the image of the electronic circuit is displayed at the first location before the image of the surface is displayed at the first location.

In a receive location step 930 a second location of a second touch on the display is received. The alpha channel is made transparent rather than opaque in a different area, again in the shape of a finger, revealing more of the image below.

In a display image step 935 (surface) the image of the surface at the second location is displayed such that a second part of the computing device appears to be transparent.

In an add virtual object step 940, a virtual object is added to the surface and/or a point of view of the object is adjusted, in response to the detected movement.

An add shadow step 945 comprises adding a simulated shadow to the image of the surface, the simulated shadow being a representation of a shadow that would be expected from part of the computing device. Thus the method typically includes adding a simulated shadow to the image of the surface, the simulated shadow being a representation of a shadow that would be expected from the virtual object. The method optionally further includes adding the interior edges of the device if it was indeed transparent, such that the width of the edges is a function of the angle at which the device is tipped, in accord with the orientation sensors of the device, so they are thinnest when the device is flat.

A detect movement step 950 includes detecting a movement of the computing device using a motion sensor, there are at least two methods of adjusting the image display to preserve the illusion of transparency: translating the image in by integrating any accelerations that are above a motion threshold, i.e. recognizing a lateral "shove" of the device; or rotating the device, for example around a corner, as described in greater detail elsewhere. In each case the system moves the image in the opposite direction and orientation in which the device is moving, so the tiled/camera image appears fixed in space and the invisibility illusion is sustained. The movement can include a rotation of the computing device, a walking motion of the computing device, and/or a sliding motion of the computing device.

An adjust position step 955 includes adjusting a position of the image of the surface on the display in response to the detected movement such that the surface appears to be stationary when the computing device is moved and the appearance of transparency is enhanced.

Figure 10:
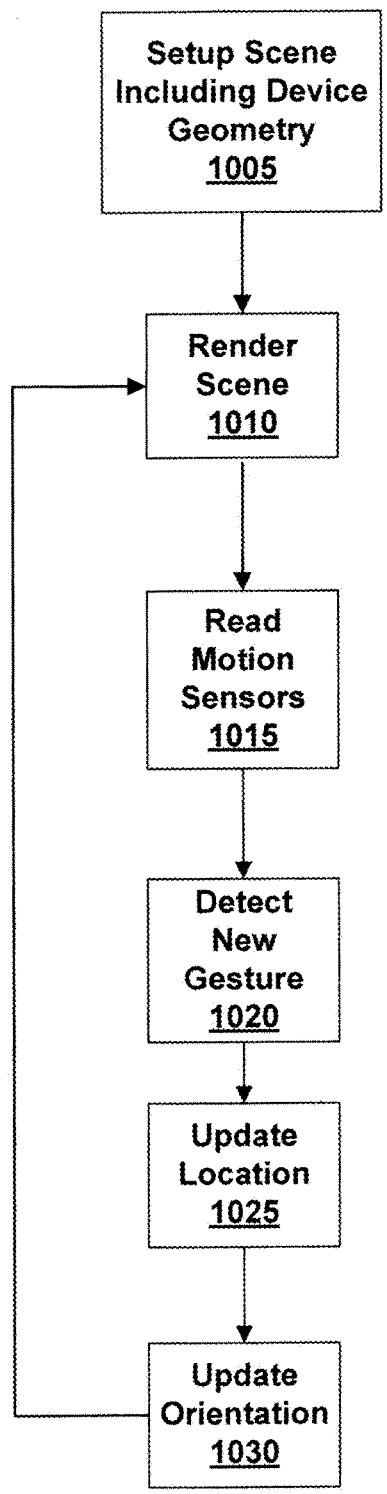
FIG. 10 illustrates further details of a navigation process, according to various embodiments of the invention.

FIG. 10 illustrates further details of a "navigation" process. The process begins by detecting the device and importing (in a step 1005) the device geometry information from a memory location (e.g., Memory 325) similar to FIG. 4, as well as importing the geometry of a 2D or 3D scene environment from a memory location, into the scene which in the simple Invisibility case was a simply a single flat image extended to infinity through tiling. The location of the device in this scene, together with a standard 3D graphics viewing frustum with an appropriate viewpoint, will determine how the scene is rendered in the initial condition In a step 1010 and as the device moves.

The scene and display are continuously updated in a loop. The motion sensors are read in a step 1015 to determine if a new gesture has begun, such as determining a change in the lowest corner of the device. In a detect new gesture step 1020 a new gesture is detected based on the motion data read from the motion sensors in read motion sensors step 1015. In an update location step 1025 the location of the device within the scene is updated as in FIG. 4. In an update orientation step the orientation of the device within the scene is updated, and the steps are repeated. Navigation is achieved when the sequence of rotational and other gestures yields net progress of the device through the space, as when walking the device across a table on adjacent corners.

Several embodiments are specifically illustrated and/or described herein. However, it will be appreciated that modifications and variations are covered by the above teachings and within the scope of the appended claims without departing from the spirit and intended scope thereof. For example, while an iPad is discussed for the purposes of example, other computing devices may be used in alternative embodiments.

The embodiments discussed herein are illustrative of the present invention. As these embodiments of the present invention are described with reference to illustrations, various modifications or adaptations of the methods and or specific structures described may become apparent to those skilled in the art. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated.

Computing systems referred to herein can comprise an integrated circuit, a microprocessor, a personal computer, a server, a distributed computing system, a communication device, a network device, or the like, and various combinations of the same. A computing system may also comprise volatile and/or non-volatile memory such as random access memory (RAM), dynamic random access memory (DRAM), static random access memory (SRAM), magnetic media, optical media, nano-media, a hard drive, a compact disk, a digital versatile disc (DVD), and/or other devices configured for storing analog or digital information, such as in a database. The various examples of logic noted above can comprise hardware, firmware, or software stored on a computer-readable medium, or combinations thereof. A computer-readable medium, as used herein, expressly excludes paper. Computer-implemented steps of the methods noted herein can comprise a set of instructions stored on a computer-readable medium that when executed cause the computing system to perform the steps. A computing system programmed to perform particular functions pursuant to instructions from program software is a special purpose computing system for performing those particular functions. Data that is manipulated by a special purpose computing system while performing those particular functions is at least electronically saved in buffers of the computing system, physically changing the special purpose computing system from one state to the next with each change to the stored data. Claims directed to methods herein are expressly limited to computer-implemented embodiments thereof and expressly do not cover embodiments that can be performed purely mentally.

The logic discussed herein may include logic such as hardware, firmware and/or software statically stored on a computer readable medium. This logic may be implemented in an electronic device to produce a special purpose computing system. This logic may be stored on a computer readable medium in a non-volatile manner.

What is claimed is:

1. A method of displaying an image, the method comprising:
    retrieving a device geometry from a memory location, the device geometry including a representation of a computing device having a display screen, edges or corners, and motion sensors, and the device geometry including spatial relationships between the display screen, edges or corner, and motion sensors;
    receiving motion or position data from the motion sensors;
    receiving an image;
    determining an orientation of the image based on the data received from the motion sensors;
    displaying an image on the display screen at the determined orientation;
    determining a first rotation anchor point based on the data received from the motion sensors;
    detecting a first motion of the computing device using the motion sensors;
    changing the orientation of the image as shown on the display screen based on the detected first motion and the first rotation anchor point;
    determining a second rotation anchor point based on the detected motion;
    detecting a second motion of the computing device using the motion sensors; and
    changing the orientation of the image as shown on the display screen based on the detected second motion and the second rotation anchor point.

2. The method of claim 1, wherein the computing device further includes a camera configured to generate the image and the device geometry includes spatial relationships between the camera and the display screen, edges or camera, or the motion sensors.

3. The method of claim 1, wherein the determination of the first rotation anchor point includes determining a lowest corner of the computing device.

4. The method of claim 1, further comprising changing to a walking mode from a mode based on a different motion.

5. The method of claim 1, wherein the image is that of a virtual 2D or 3D environment and detection of the first and second motions result in navigation through this environment.

6. The method of claim 1, wherein the step of displaying an image on the display screen includes rendering a 2D or 3D model.

7. The method of claim 1, wherein the representation of the computing device comprises a representation of a smart phone or tablet computer.

8. The method of claim 1, wherein the step of receiving motion or position data from the motion sensors includes receiving at least one of a 3D acceleration, a 3 axis rotation, and a gravity vector estimation.

9. The method of claim 1, wherein the step of determining the second rotation anchor point includes determining the second rotation anchor point based on the first rotation anchor point.

10. A non-transitory computer readable medium having statically stored thereon logic co p sing:
    logic configured for retrieving a device geometry from a memory location, the device geometry including a representation of a computing device having a display screen, edges or corners, and motion sensors, and the device geometry including spatial relationships between the display screen, edges or corner, and motion sensors;
    logic configured for receiving motion or position data from motion sensors;
    logic configured for receiving an image;
    logic configured for determining an orientation of the image based on the received motion sensor data;
    logic configured for displaying an image on a display screen at the determined orientation;
    logic configured for determining a first rotation anchor point based on the received motion sensor data;
    logic configured for detecting a first motion of a computing device using motion sensors of the computing device;
    logic configured for changing the orientation of the image as shown on the display screen based on the detected first motion and the first rotation anchor point;
    logic configured for determining a second rotation anchor point based on the detected motion;
    logic configured for detecting a second motion of the computing device using the motion sensors; and
    logic configured for changing the orientation of the image as shown on the display screen based on the detected second motion and the second rotation anchor point.

11. The non-transitory computer readable medium of claim 10, having further statically stored thereon logic configured for generating the image and wherein the device geometry includes spatial relationships between the camera and the display screen, edges or camera, or the motion sensors.

12. The non-transitory computer readable medium of claim 10, wherein the logic configured for determining the first rotation anchor point is further configured for determining a lowest corner of the computing device.

13. The non-transitory computer readable medium of claim 10, having further statically stored thereon logic configured for changing to a walking mode from a mode based on a different motion.

14. The non-transitory computer readable medium of claim 10, wherein the image is that of a virtual 2D or 3D environment and wherein the non-transitory computer readable medium has further statically stored thereon logic configured to use the detected first and second motions to navigation through this environment.

15. The non-transitory computer readable medium of claim 10, wherein the logic configured for displaying the image on the display screen includes logic configured for rendering a 2D or 3D model.

16. The non-transitory computer readable medium of claim 10, wherein the representation of the computing device comprises a representation of a smart phone or tablet computer.

17. The non-transitory computer readable medium of claim 10, wherein the logic configured for receiving motion or position data includes logic configured for receiving at least one of a 3D acceleration, a 3 axis rotation, and a gravity vector estimation.

18. The non-transitory computer readable medium of claim 10, wherein the logic configured for determining the second rotation anchor point includes logic configured for determining the second rotation anchor point based on the first rotation anchor point.

19. The non-transitory computer readable medium of claim 10, wherein changing the orientation of the image includes changing the orientation of a 3D object within the image.

20. The non-transitory computer readable medium of claim 19, wherein the 3D object includes an avatar.

* * * * *